United States Patent [19]

Dahl

[11] 3,802,343

[45] Apr. 9, 1974

[54] PROXIMITY FUSE

[75] Inventor: Bjorn Dahl, Kongsberg, Norway

[73] Assignee: A/S Kongsberg Vapenfabrikk, Kirkegardsveien, 3600 Kongsberg, Norway

[22] Filed: Mar. 12, 1973

[21] Appl. No.: 340,034

[30] Foreign Application Priority Data

Mar. 10, 1972 Norway ................................ 777/72

[52] U.S. Cl. ........................... 102/70.2 P, 343/7 PF

[51] Int. Cl. ......................... F42c 13/04, F42c 13/00

[58] Field of Search ................ 102/70.2 P; 343/7 PF

[56] References Cited

UNITED STATES PATENTS

| | | | |
|---|---|---|---|
| 2,907,023 | 9/1959 | Skinner | 102/70.2 P |
| 3,326,130 | 6/1967 | Baker | 102/70.2 P |
| 3,614,781 | 10/1971 | Lichtman | 343/7 PF |

*Primary Examiner*—Benjamin A. Borchelt

*Assistant Examiner*—C. T. Jordan

[57] ABSTRACT

A proximity fuse which is insensitive to spurious signals which could cause false detonation of the projectile. Two frequency selective amplifiers having different band-pass characteristics both receive the same input signals. The narrower band-pass filter activates the detonator, while the broader band-pass filter will block the narrow channel if a signal exceeding a given value is received at the input.

8 Claims, 3 Drawing Figures

PROXIMITY FUSE

BACKGROUND OF THE INVENTION

The present invention generally relates to proximity fuses as would be used to detonate a projectile, and more particularly to a proximity fuse which blocks undesired noise signals that might cause unintentional detonation of the projectile.

There has been proposed in the art a proximity fuse which comprises an electronic circuit which is sensitive to signals in given frequency bands. The proximity circuit which may be an integral part of a projectile, responds to signals transmitted from the designated target, or it may respond to reflected signals originally transmitted from the discharged projectile, e.g., doppler signals.

Proximity fuses of this known type are subject to the risk of being influenced by spurious signals which may cause false detonation of the projectile.

SUMMARY OF THE INVENTION

The purpose of the present invention is to provide a proximity fuse which blocks undesired noise signals that might occur and thereby prevent the projectile from unintentional detonation.

According to the present invention, this is achieved by means of a proximity fuse comprising two frequency selective amplifiers having different band-pass characteristics and both receiving the same input signals. The proximity fuse according to the invention is primarily characterized in that the first amplifier having the narrower band-pass filter, upon receiving a signal exceeding a given value activates a detonator, while the second amplifier, having the broader band-pass filter, blocks the input of the first amplifier if a signal exceeding a given value appears in the bandpass filter of the second amplifer.

The desired blocking can be achieved due to both amplifiers having differential inputs, the non-inverted inputs receiving the same signal and the blocking of the first amplifier is undertaken by a resetting circuit of the second amplifier directly affecting the inverted input of the first amplifier, whereby blocking of the first amplifier occurs.

Arming of the proximity fuse after the discharging of the projectile can be prevented by connecting delay elements consisting of resistors and condensers to the inputs of the amplifiers thereby blocking both amplifiers from functioning until a certain time after they have received supply voltage.

The blocking of the first amplifier can be given a prolonged effect after the signals in the other pass-band have ceased to appear, by discharging the condenser forming the delay element of the first amplifier when blocking is initiated.

BRIEF DESCRIPTION OF THE DRAWINGS

The invention will be described in more detail hereinbelow with reference to the drawing, which shows a preferred embodiment of a proximity fuse according to the invention, and wherein.

DETAILED DESCRIPTION OF A PREFERRED INVENTIVE EMBODIMENT

Figure 1:
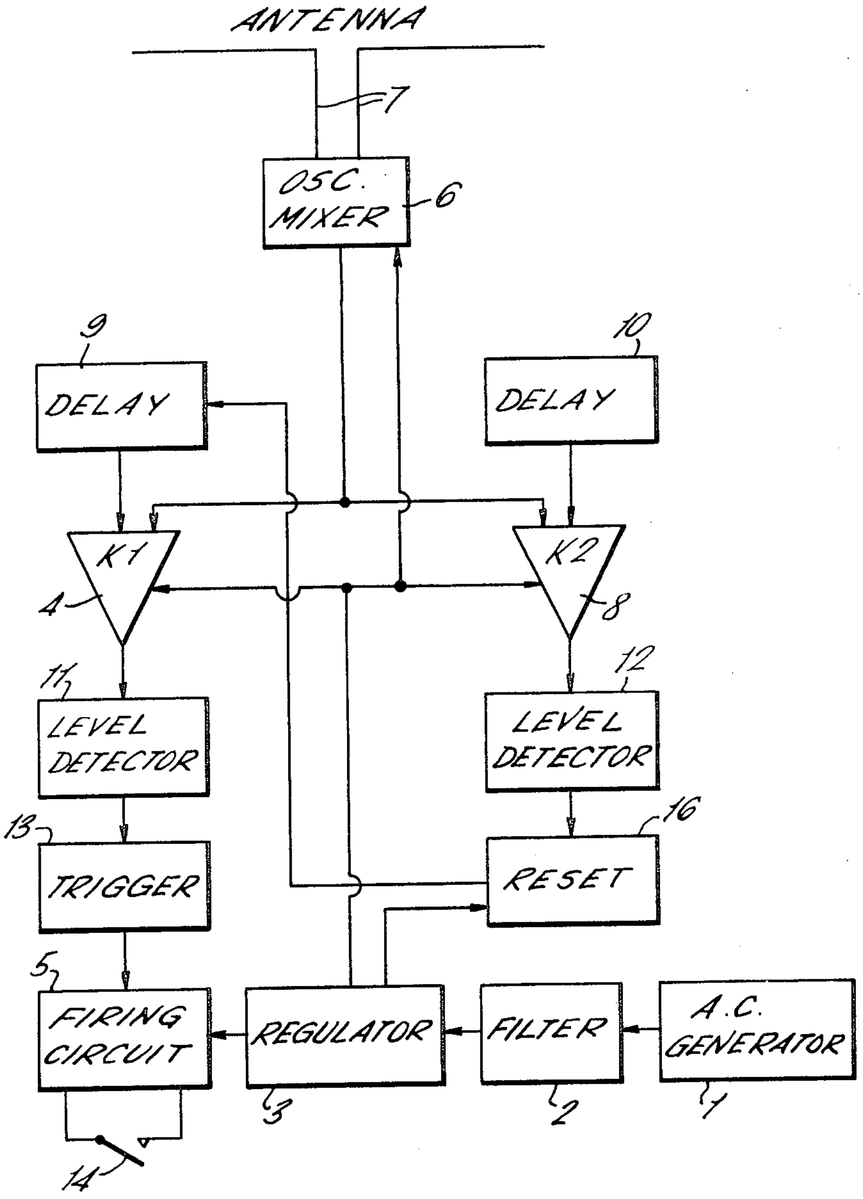
FIG. 1 is a block diagram of the components included in the proximity fuse.

In FIG. 1, there is shown an A.C. generator 1 driven, for example, by a wind turbine (not shown). The generator 1 supplies current to a filter 2. From the filter 2, a smoothed rectified voltage is supplied to a regulator 3, from which the smoothed D.C. voltage is fed to the remaining circuit.

When the regulator 3 supplies voltage to the other components, high frequency waves are transmitted by an oscillator in an oscillator-mixer-unit 6 via a bipolar antenna 7. The interference between the transmitted and received signals (doppler signals) which is produced in a mixer in the unit 6, is amplified by frequency selective low frequency amplifiers 4 and 8 having different band-width characteristics. If the signal from the mixer 6 lies within the band-width of amplifier 4, a level detector 11 will pass the first oscillations of the amplified doppler signal on, if the same has a given value. The height of detonation or the distance from the target is determined by the setting of the level detector 11 and the low frequency amplifier 4. A trigger 13 closes a firing circuit 5 upon receipt of the first signal from the level detector 11.

If the signal from the mixer 6 includes frequencies which also lie within the frequency range of the filter of the amplifier 8, the level detector 12 will pass the first oscillations of the signal on, if the same has a given value. A reset unit 16 then blocks the amplifier 4 via the delay unit 9, making the blocking instantaneous, whereas the effect of the blocking is not terminated until some time after the signal from the amplifier 8 has disappeared.

The delay elements 9 and 10 prevent any charging of one or more firing condensers during the initial time after the discharging of the projectile. Further, such elements cause the low frequency amplifier 4 to be switched in a certain time after the low frequency amplifier 8 has been switched in.

The firing circuit 5 consists of a firing condenser $C_D$ (FIG. 2) connected in series with an electrical detonator $R_D$. Charging of the condenser takes place at a time T2 after the discharging phase has started and lasts for a time T4. The firing circuit 5 as such remains open until it is closed either by the signal from the trigger circuit 13 or by a target switch 14. The electromechanical target switch 14 is connected in parallel with the firing circuit 5.

The detonation capsule fuse consists of two independent groups (FIG. 2), one of which constitutes an electrical detonator $R_D$ with a short circuit switch 15, a firing condenser $C_D$ and a target switch 14, and the other constituting a firing amplifier Q1. The reset unit 16 influences the delay unit 9 of the low frequency amplifier 4 either from the regulator 3 or from the low frequency amplifier 8 through its signal level detector 12.

Figure 2:
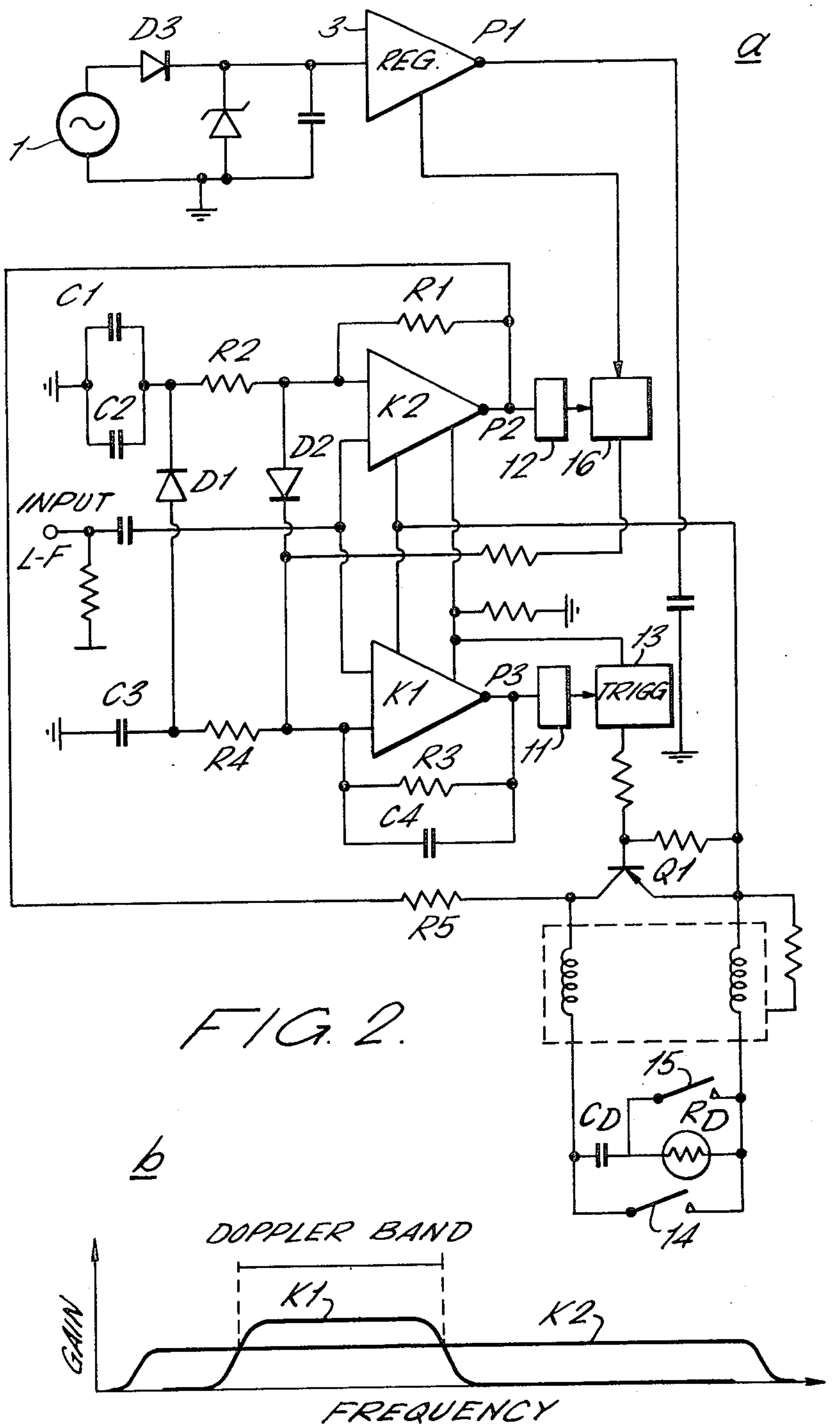
FIG. 2*a* shows the connection between the components.
FIG. 2*b* shows the frequency response curve of the amplifiers K1 and K2.

The electrical operation of the circuit will now be described with reference to FIG. 2.

By discharging the projectile, the interlocking of the detonation capsule is released by the opening of the short circuit switch 15. Immediately upon leaving the discharging tube, the turbine (not shown) starts rotating and driving the generator. The current supply is thereby established, and at P1, the regulator 3 will accordingly supply the correct voltage to the remaining circuit. Approximately the same voltages as at P1 will be found at P2 and P3. A delay condenser $C_3$ is charged through resistors $R_3$ and $R_4$. After a time T1 the voltage across the condenser $C_3$ is so high that the amplifier K1 comes into operation. At the same instant, the voltage at P3 collapses. The delay condensers $C_1$ and $C_2$ and charged through resistors $R_1$ and $R_2$, and, after a time T2, the voltage across $C_1$ and $C_2$ has reached a level high enough to put the amplifier K2 into operation. At the same time, the voltage at P2 collapses and only by now there appears a voltage difference between P1 and P2 in the firing condenser circuit. The firing condenser $C_D$ is now charged through resistor $R_D$ (firing capsule) and resistor $R_5$. After a time T3, the safety limit is exceeded, and after a time T4, the condenser $C_D$ is fully charged. The proximity fuse is accordingly ready for proximity firing operation after a time T5 composed of T2 + T4. Complete safety is guaranteed during the initial time T6 composed of T2 + T3.

If one of the condensers $C_1$, $C_2$ or $C_3$ collapses, the delay is reduced to a value determined by the sum of the remaining condenser capacities.

The two amplifiers K1 and K2 have an identical design and a common frequency input. This means that the input to the amplifier K2 includes the same signals as the input to amplifier K1. The output P2 from K2 is connected to the input of amplifier K1 via the signal level detector 12 and the reset circuit 16. The only difference between the amplifiers consists in their bandwidth characteristics (FIG. 2*b*).

There is shown in FIG. 2*b* that the sensitivity of the blocking amplifier K2 is high within a relative broad frequency band, but the sensitivity of the doppler amplifier K1 apart from the doppler range is relatively low. In the doppler range, the gain of the doppler amplifier is necessarily higher than the gain of the blocking amplifier. This design has a decisive influence on the further operation of the circuit.

When the projectile approaches the target, the doppler signal will normally arrive at the common low-frequency input (L-F). The doppler signal is amplified in the doppler amplifier K1, and the signal level detector 11 lets through the first oscillation of the amplified doppler signal above a given amplitude level.

The blocking amplifier has in this case no function, as the gain of same is less than that of the doppler amplifier.

The trigger circuit 13 affects the transistor Q1 so that the firing circuit is closed, and the detonation capsule is fired by the discharging of the firing condenser $C_D$ through $R_D$.

There often appear disturbing signals as, for instance, noise, radar, and others, which influence the firing circuit. If these signals have frequency components in the doppler band and also a signal level above a given value, they may cause detonation at an undesired location along the path of the projectile. In most instances, such disturbing signals also have frequency components appearing outside the doppler band. In this case, the blocking amplifier comes into operation, having a high sensitivity within a broad band on either side of the doppler band. The signals are amplified through the blocking amplifier, which amplification is parallel to the amplification of the signals with doppler frequency in the doppler amplifier. However, the amplification in the blocking amplifier takes a more rapid course than the one in the doppler amplifier. An amplified blocking signal from the blocking amplifier K2 passes the level detector 12 and reaches the input of the doppler amplifier K1 via the reset unit 16. Thereby, the doppler amplifier is blocked and remains blocked for a given time, e.g., approximately .6 seconds, whereby an undesired detonation is avoided. If after this time, there still remain frequency components outside the doppler band, the doppler amplifier is again blocked if the level of the noise signals is above a given value. In the worst case, the blocking will remain until the projectile hits the target. However, the blocked proximity fuse will then operate as a sensitive target switch proximity fuse.

In the circuit shown, the mutual interference between K1 and K2 may be varied by changing the respective gains and bandwidths.

The upper cut-off frequency for K2 is fixed by an internal connection in the embodiment described above (FIG. 2), but can be reduced by connecting a condenser in parallel to $R_1$.

The sensitivity of K2 to noise will be larger if the passband of K1 and K2 is separated at the same time as the gain of K2 is increased.

The circuit shown is a special version among several possible variations, where specific emphasis is placed on double security delay for the firing system during the initial seconds after the discharging of the projectile. In the circuit, there are included several diodes D1 and D2 which connect the circuits during the expiration of the delay sequence if one or two of the condensers C1, C2, or C3 should fail due to the discharge shock.

Another embodiment of a proximity fuse according to the present invention may comprise a plurality of frequency selective amplifiers receiving the same input signals. One of the amplifiers, having a given narrow pass-band, activates the detonator upon receiving signals having amplitudes above a given level in its pass-band. The remaining amplifiers, which may be equipped with bandpass filters covering signals which include frequencies ranging over and below the pass-band of said amplifier, then block the input to this amplifier.

What is claimed is:

1. A proximity fuse comprising two frequency selective amplifier means having different band-pass characteristics and connected such that both receive the same input signals, said first amplifier means including a relatively narrow band-pass filter and being connected to activate a detonator upon receiving a signal above a given value, said second amplifier means including a relatively broader band-pass filter and being connected to said first amplifier means so as to block the input of said first amplifier means if a signal above a given value appears in said band-pass filter of said second amplifier means.

2. A proximity fuse as defined in claim 1, wherein both amplifiers have differential inputs, the non-inverted inputs receiving the same signal, and wherein the blocking of said first amplifier means is effected by a resetting circuit means of said second amplifier means through the inverted input of said first amplifier means, whereby blocking of said first amplifier means occurs.

3. A proximity fuse as defined in claim 1, wherein delay elements are connected to the inputs of both amplifiers, said delay elements including resistors and condensers for bringing said second amplifier means into operation at a given time after the discharging of a projectile, and for bringing said first amplifier means into operation after a given time.

4. A proximity fuse as defined in claim 3, wherein the blocking of said first amplifier means is given a prolonged effect after the signals in the other pass-band filter cease to appear by discharging the condenser forming said time-delay element for said first amplifier means when blocking is initiated.

5. A proximity fuse as defined in claim 1, wherein the pass-band filter of the second amplifier means covers signals including frequencies lying below, within and above the pass-band range of the filter of the first amplifier means, the gain of the second amplifier means being approximately equal throughout the frequency range but less than the gain within the pass-band filter of the first amplifier means.

6. A proximity fuse as defined in claim 5, wherein the gain of the second amplifier means is relatively low in the frequency range of the first amplifier means.

7. A proximity fuse as defined in claim 1, wherein the pass-band filter of the second amplifier means substantially covers only signals including frequencies above the upper cut-off frequency of the first amplifier means.

8. A proximity fuse as defined in claim 7, wherein the gain of the second amplifier means is higher than that of the first amplifier means.

* * * * *